(12) United States Patent
Masuda et al.

(10) Patent No.: US 7,224,092 B2
(45) Date of Patent: May 29, 2007

(54) BRUSHLESS MOTOR

(75) Inventors: Kumio Masuda, Tottori (JP); Kinjiro Okinaga, Tottori (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 11/347,072

(22) Filed: Feb. 3, 2006

(65) Prior Publication Data

US 2006/0175922 A1    Aug. 10, 2006

(30) Foreign Application Priority Data

Feb. 8, 2005  (JP) .............................. 2005-031392

(51) Int. Cl.
*H02K 11/00*  (2006.01)

(52) U.S. Cl. ..................................... 310/67 R; 310/91

(58) Field of Classification Search ................. 310/90,
310/90.5, 214, 42, 43, 67 R, 91
See application file for complete search history.

(56) References Cited

U.S. PATENT DOCUMENTS

| | | | |
|---|---|---|---|
| 6,333,576 B1 * | 12/2001 | Ishikawa et al. .............. | 310/85 |
| 6,661,131 B2 * | 12/2003 | Fukutani ...................... | 310/51 |
| 6,919,657 B2 * | 7/2005 | Horng et al. ............. | 310/67 R |

FOREIGN PATENT DOCUMENTS

| | | |
|---|---|---|
| JP | 08-172763 | 7/1996 |
| JP | 2002-262540 | 9/2002 |

* cited by examiner

*Primary Examiner*—Darren Schuberg
*Assistant Examiner*—Nguyen Hanh
(74) *Attorney, Agent, or Firm*—RatnerPrestia

(57) ABSTRACT

A hole piercing a bracket and another hole piercing a circuit board are formed at places between adjacent two salient poles among a plurality of salient poles of a stator core and the places correspond to tips of the two salient poles. A relative position between a hall element mounted on the circuit board and the stator core can be adjusted with a jig through those holes.

4 Claims, 5 Drawing Sheets

BRUSHLESS MOTOR

FIELD OF THE INVENTION

The present invention relates to a brushless motor to be used for driving disks in an apparatus for recording and reproducing information, such as a CD-ROM (R/RW) apparatus and a DVD±(R/RW) apparatus. More particularly, it relates to a structure of a stator of a motor which spins stably at a high rpm.

BACKGROUND OF THE INVENTION

In an apparatus for recording and reproducing information into/from disks such as a CD-ROM (R/RW) apparatus or a DVD±(R/RW) apparatus, a motor for driving a disk employs a brushless motor (hereinafter referred to simply as a motor), which can rotates at a rotational speed of wide range and be excellent in controllability and reliability. This kind of motors is disclosed in Unexamined Japanese Patent Publication No. 2002-262540.

The first conventional motor discussed above is shown in FIG. 5, where shaft 31 is an output shaft of the motor, and transmits rotations to a load mounted to shaft 31. On the inner wall of rotor frame 32, ring-shaped rotor magnet 33 magnetized circularly in multi-pole is disposed by press-fitting or bonding. Rotor frame 32 has carried out a burring at its center so that shaft 31 is press-fitted directly into the center burred. Rotor assembly (rotor) 34 is thus formed of shaft 31, rotor frame 32 and rotor magnet 33.

Bracket 35 is made of magnetic material and formed by press working. Bracket 35 includes step-like and projecting burred section 35a at its substantial center. Burred section 35a works as a bearing housing for accommodating a bearing. Bracket 35 is formed unitarily of burred section 35a and mounting base 35b with which the motor is mounted. Inside burred section 35a, bearing 36 (oil retaining metal) is press-fitted, and bearing 36 supports shaft 31 rotatably.

Outside burred section 35a, stator core 37 having a plurality of salient poles is disposed. Stator core 37 is wound with stator coil 38 via an insulator made of resin. Stator winding assembly 39 is thus formed.

Circuit board 41 (printed circuit board), which includes at least parts of a circuit for driving and controlling the motor, is rigidly mounted to mounting base 35b with adhesive tape (not shown). Stator coil 38 of stator winding assembly 39 is wired onto circuit board 41 at its winding end, so that stator assembly (stator) 42 is formed.

Metal holder 43 is press-fitted and fixed to the inner wall of stator core 37 in order to prevent the oil of bearing 36 from scattering and to collect the oil. Stopper 44 for preventing rotor assembly 34 from coming off along the thrust direction is press-fitted on the end of shaft 31. Bottom plate 45 supports the load of rotor assembly 34 applied along the thrust direction, in other words, shaft 31 is supported by bottom plate 45 at its tip along the thrust direction via wear-proof board 46 made of resin. Bottom plate 45 is press-fitted and fixed in the vicinity of an entrance of burred section 35a of bracket 35.

Recently CD-ROM (R/RW) apparatuses and DVD±(R/RW) apparatuses have drastically increased their throughput speeds, so that the rpm of the motor driving a disk becomes over as high as 10,000 rpm. Since a DC motor has a restriction that back electromotive force induced in the stator coil must be lower than a voltage of the power supply which applies a voltage to the motor, a power generation constant, namely, a generation voltage per unit rpm of the motor needs to be smaller. Thus a torque constant, i.e. torque generated per unit current of the motor, becomes smaller.

Since disks spin at a higher rpm, the disks cause greater vibration due to unbalance of them, the bearing causes a greater loss, a magnetic circuit of the motor causes a greater iron-loss, and the stator coil causes a greater copper-loss. As a result, the motor consumes a greater current conspicuously. In order to reduce the foregoing losses, it is important not only modifying respective elements of the motor to the ones achieving lower-loss, but also reducing dispersions due to errors produced by combining the elements.

A brushless motor determines its rectifying timing based on a positional relation along a rotating direction of the rotor between a hall element, which detects magnetic poles of the rotor magnet, and the stator core. If an error occurs in this rectifying timing, the torque constant decreases and the motor consumes a greater current.

The hall element is mounted, in general, on a circuit board. For instance, Unexamined Japanese Patent Publication No. H08-172763 discloses one of the hall elements. A structure of the second conventional motor discussed above is shown in FIG. 6, where hall element 50 is mounted on circuit board 51, to which housing 52 for holding a bearing is fixed. Housing 52 is mounted with stator core 53, so that the positional relation between hall element 50 and stator core 53 along the rotating direction of the rotor is determined by the following three mounting positions: mounting position of hall element 50 to circuit board 51, mounting position of circuit board 51 to housing 52, and mounting position of stator core 53 to housing 52.

In the first conventional motor shown in FIG. 5, circuit board 41 is mounted to bracket 35, and stator core 37 is mounted to burred section 35a formed unitarily with bracket 35 and working as a housing. In FIG. 5, although a hall element is not shown, the positional relation between the hall element mounted to circuit board 41 and stator core 37 along the rotor rotating direction is determined by the following three mounting positions: mounting position of the hall element to circuit board 41, mounting position of circuit board 41 to bracket 35, and mounting position of stator core 37 to burred section 35a.

The foregoing constructions of the first and the second conventional motors allow the positional relation along the rotor rotating direction between the circuit board and the stator core to improve its accuracy by providing protrusions for positioning. However, since the hall element is mounted to the circuit board by soldering, there is a limit of improving the positional accuracy. As a result, in the case of driving a motor at over 10,000 rpm, the motor current increases conspicuously, and the increased motor current disperses wider due to the positional dispersion of soldering the hall element.

SUMMARY OF THE INVENTION

A brushless motor of the present invention is formed of a rotor assembly and a stator assembly, and the respective assemblies comprise the following elements:

the rotor assembly comprising a shaft, a rotor frame mounted with the shaft, and a rotor magnet disposed on an inner wall of the rotor frame; and the stator assembly comprising the following elements:
   a bearing for supporting the shaft,
   a bearing housing for holding the bearing,
   a bracket including the bearing housing, a stator core disposed outside the bearing housing and having a plurality of salient poles confronting to the rotor magnet, a stator coil wound on the respective salient poles via an insulator, and; and a circuit board on which a hall element for detecting magnetic poles of the rotor magnet is mounted and to which an end of the stator coil is coupled electrically.

The circuit board is fixed to the bracket, and a through-hole piercing the bracket and another through-hole piercing the circuit board are formed at a place between adjacent salient poles among the plurality of salient poles of the stator core and corresponding to tips of the salient poles.

The foregoing structure allows adjusting a load current of the motor to be minimized while the assembled motor rotates with a load. To be more specific, the load current can be adjusted in the following manner: insert a jig from the outside of the motor through the holes discussed above, namely the hole piercing the bracket and the other hole piercing the circuit board, and bring the jig into contact with the tip of a salient pole. Then rotate the stator core with the jig along a rotating direction or an anti-rotating direction of the motor with respect to the hall element, thereby adjusting the load current of the motor to be minimized.

As discussed above, the motor of the present invention needs a through hole piercing the bracket and another hole piercing the circuit board so that the jig can be inserted into the through holes, which holes are formed at a place corresponding to tips of the salient poles of the stator core. This structure needs less torque for adjustment than the case where the holes are formed at more inner side from the tip of the stator core, so that an amount to be adjusted can be controlled more easily and a more accurate adjustment can be expected. As a result, an error of rectifying timing due to dispersion of mounting position of the hall element onto the circuit board can be canceled. On top of that, an accurate adjustment of a positional relation along the rotor rotating direction between the hall element mounted on the circuit board and the stator core will suppress a dispersion of the motor current particularly at a high rpm operation of the motor. Thus the motor of the present invention can operate stably at a high rpm.

DETAILED DESCRIPTION OF PREFERRED EMBODIMENTS

Exemplary embodiments of the present invention are demonstrated hereinafter with reference to the accompanying drawings.

Exemplary Embodiment 1

Figure 1:
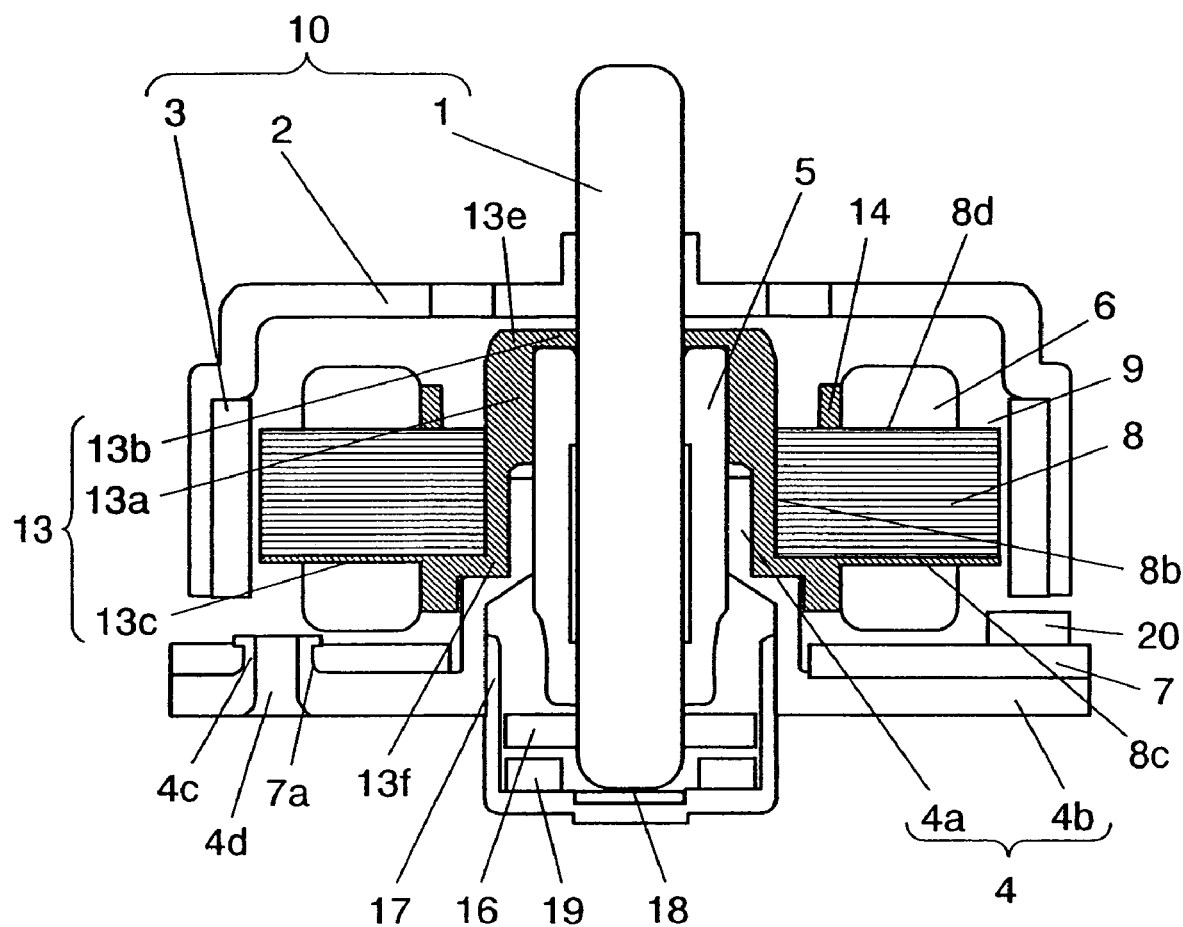
FIG. 1 shows a sectional view illustrating a structure of a motor in accordance with a first embodiment of the present invention.
Figure 2A:
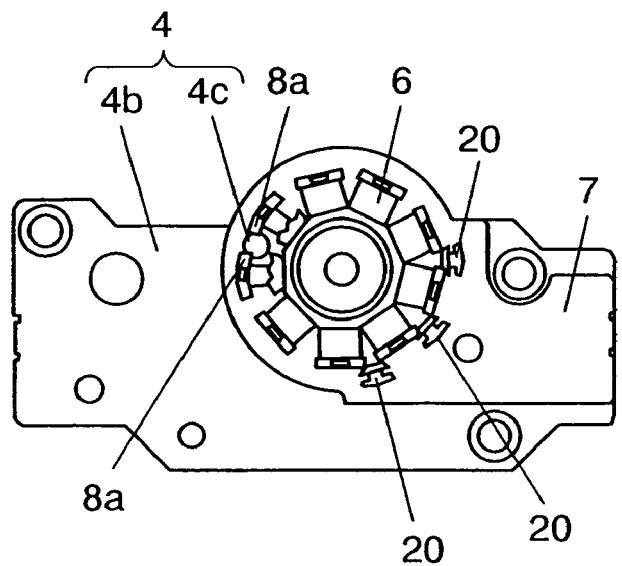
FIG. 2A is a plan view of a stator assembly of the motor shown in FIG. 1.
Figure 2B:
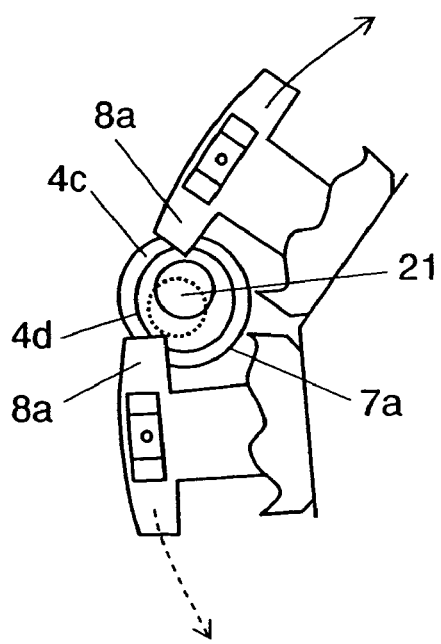
FIG. 2B is a schematic diagram illustrating holes formed on a bracket and a circuit board of the motor shown in FIG. 1, and the holes are formed at places corresponding to tips of salient poles.
Figure 2C:
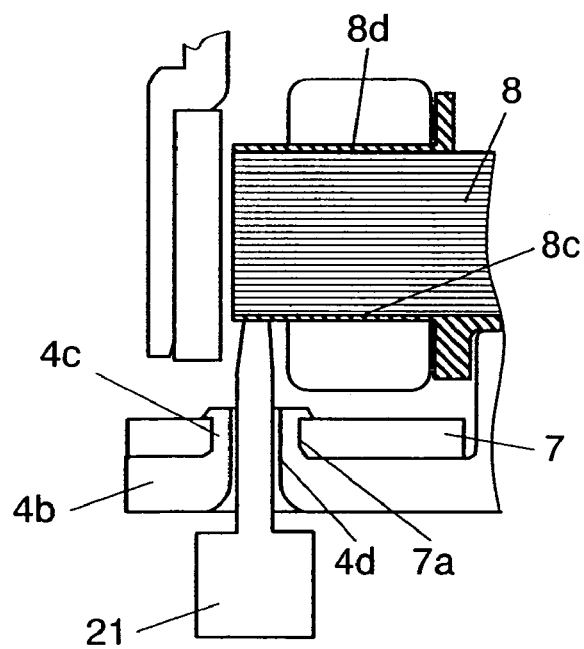
FIG. 2C is a schematic diagram illustrating how to adjust a relative position between a hall element mounted on the circuit board and a stator core with a position adjusting jig through the holes formed on the bracket and the circuit board.
Figure 3:
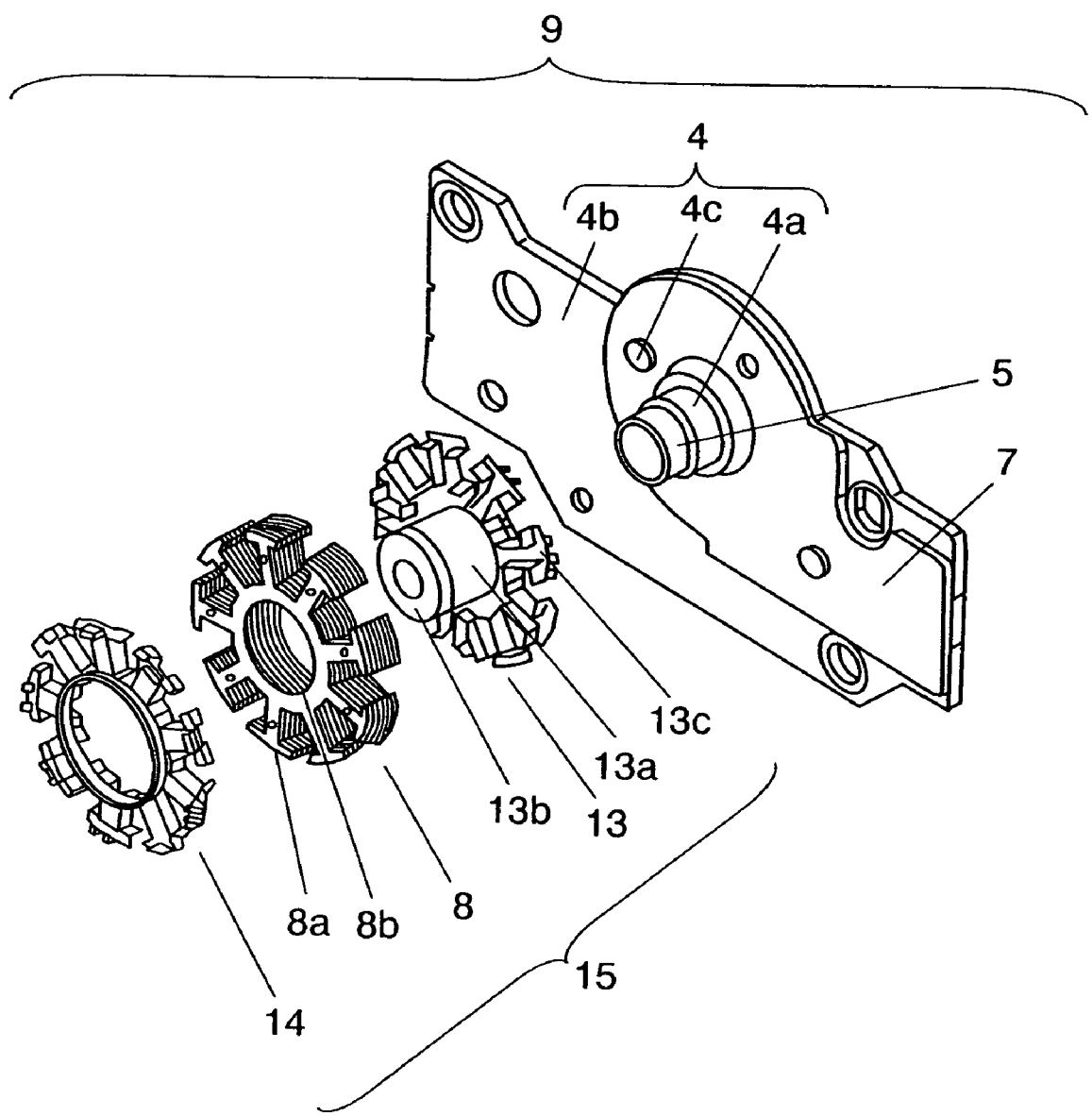
FIG. 3 shows a schematic diagram illustrating the stator assembly of the motor shown in FIG. 1.
Figure 4A:
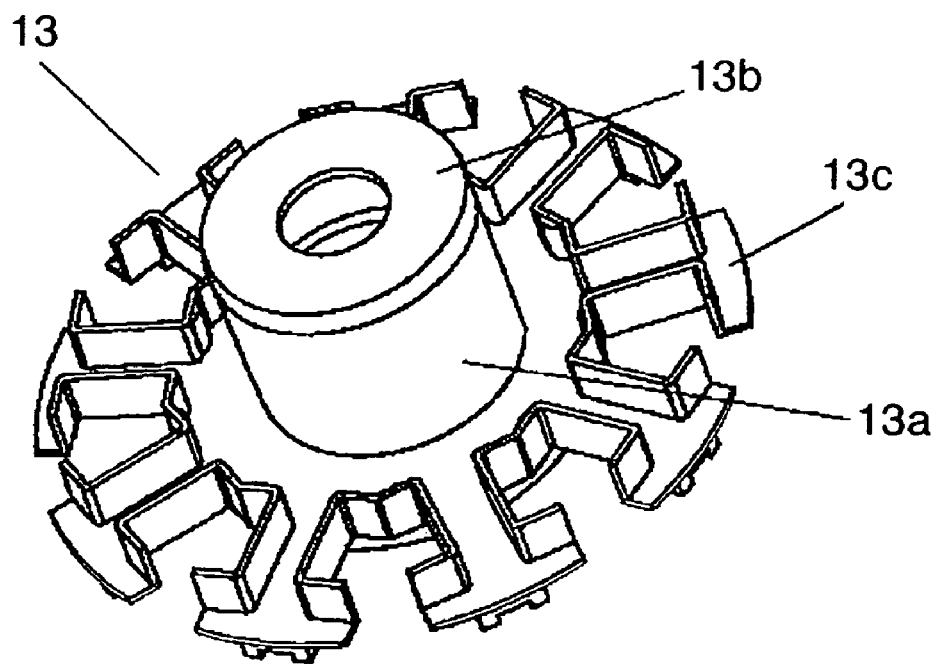
FIG. 4A shows a perspective view of a metal holder of the motor shown in FIG. 1.

FIG. 1 shows a sectional view illustrating a structure of a motor in accordance with the first embodiment of the present invention. FIG. 2A is a plan view of a stator assembly of the motor shown in FIG. 1. FIG. 2B is a schematic diagram illustrating holes formed on a bracket and a circuit board of the motor shown in FIG. 1, and the holes are formed at places between adjacent two salient poles and corresponding to tips of the two salient poles. FIG. 2C is a schematic diagram illustrating how to adjust a relative position between a hall element mounted on the circuit board and a stator core with a position adjusting jig through the holes formed on the bracket and the circuit board. FIG. 3 shows a schematic diagram of the stator assembly of the motor shown in FIG. 1. FIG. 4A shows a perspective view of a metal holder of the motor shown in FIG. 1.

First, the principal elements of the motor in accordance with the first embodiment are described hereinafter with reference to FIG. 1. The motor is formed of rotor assembly (rotor) 10 and stator assembly (stator) 9.

Rotor 10 comprises shaft 1, rotor frame 2 having shaft 1, and rotor magnet 3 disposed on the inner wall of rotor frame 2.

Stator 9 comprises the following elements:
bearing 5 for supporting shaft 1,
bearing housing 4a for holding bearing 5,
bracket 4 including bearing housing 4a,
stator core 8 disposed outside bearing housing 4a and having a plurality of salient poles confronting to rotor magnet 3,
stator coil 6 wound on the respective salient poles via an insulator, and
circuit board 7 on which hall element 20 for detecting a magnetic pole of the rotor magnet is mounted and, to which an end of the stator coil is coupled electrically.

Circuit board 7 is fixed to bracket 4, and through-holes are formed at places between two adjacent salient poles of stator core 8 and corresponding to tips of the two salient poles. The through-hole 4d pierces bracket 4, and another hole 7a pierces circuit board 7.

The structure of the motor shown in FIG. 1 is further detailed hereinafter. In FIG. 1, shaft 1 is an output shaft of the motor, and conveys rotations to a load mounted to shaft 1. On the inner wall of rotor frame 2, ring-shaped rotor magnet 3 magnetized circularly in multi-pole is disposed by press-fitting or bonding. Rotor frame 2 has carried out a burring at its center so that shaft 1 is press-fitted directly into the center burred. Rotor 10 is thus formed of shaft 1, rotor frame 2 and rotor magnet 3.

Bracket 4 is made of magnetic material and formed by press working. Bracket 4 has step-like bearing housing 4a projecting at its substantial center, and also forms mounting base 4b, with which the motor is mounted, and bearing housing 4a unitarily.

Bearing 5 is press-fitted and fixed to bearing housing 4a of bracket 4, and supports shaft 1 rotatably. Bearing 5 employs, e.g. oil retaining metal. Stator core 8 is formed by laminating a plurality of thin silicon-steel plates and includes a plurality of salient poles 8a as shown in FIG. 3, and hole 8b at its center.

Next, a structure of metal holder 13 shown in FIG. 1 is detailed. Metal holder 13 is made of insulating resin, and its perspective view is shown in FIG. 4A. Metal holder 13 includes cylindrical section 13a of which outer diameter is the same as or a little bit smaller than the inner diameter of hole 8b formed on stator core 8. Metal holder 13 has first end 13e along the axial direction of cylindrical section 13a, and end face 13b extends from first end 13e toward the inside. Metal holder 13 has second end 13f along the axial direction of cylindrical section 13a, and a plurality of wings 13c extends from second end 13f and form right angles with respect to the axial direction such that wings 13c cover first end faces 8c along the axial direction of respective salient poles 8a of stator core 8.

As shown in FIG. 3, insert cylindrical section 13a of metal holder 13 into hole 8b formed at the center of stator core 8 from its end face 13b, and bring wings 13c of metal holder 13 into solidly contact with first end faces 8c along the axial direction of the respective salient poles 8a. Then rigidly mount parts of the outer wall of cylindrical section 13a to the hole wall of hole 8b of stator core 8 by press-fitting or bonding.

Insulator 14 independent of wing 13c is disposed to cover second end face 8d of stator core 8. Second end face 8d is on the other side of first end face 8c, which is covered by wing 13c, with respect to stator core 8. Stator coil 6 (not shown in FIG. 3) is wound on stator core 8 via wing 13c and insulator 14, so that stator winding assembly 15 is formed.

As shown in FIG. 1, the inner wall of cylindrical section 13a of metal holder 13 is rigidly mounted to the outer wall of bearing housing 4a. Circuit board 7 has hall element 20, which works as a position detecting element for detecting magnetic poles of rotor magnet 3, as well as at least parts of a circuit for driving and controlling the motor. Circuit board 7 is, e.g. a printed circuit board.

As shown in FIGS. 2A, 2B, and 2C, mounting base 4b of bracket 4 has burred section 4c at a place between adjacent two salient poles 8a and corresponding to tips of the two salient poles 8a. Burred section 4c includes hole 4d shown in FIG. 1. Circuit board 7 includes hole 7a at a place corresponding to burred section 4c so that burred section 4c can go through hole 7a. In other words, hole 4d piercing bracket 4 and hole 7a piercing circuit board 7 are formed at a place between adjacent two salient poles 8a among the plurality of salient poles and corresponding to the tips of the adjacent two salient poles 8a.

Burred section 4c goes through hole 7a, then the other side of burred section 4c projecting from the surface on the other side of mounting base 4b is riveted outward, so that circuit board 7 is fixed to bracket 4.

The foregoing structure allows rigidly mounting circuit board 7 to bracket 4 as well as forming a hole piercing bracket 4 and another hole piercing circuit board 7 at a place between adjacent two salient poles 8a among the plurality of salient poles and corresponding to the tips of the adjacent two salient poles 8a.

As shown in FIG. 3, bearing 5 is inserted into the inner wall of cylindrical section 13a of metal holder 13 of stator winding assembly 15, and at the same time assembly 15 is rigidly mounted to the outer wall of bearing housing 4a by press-fitting. A winding end of stator coil 6 of stator winding assembly 15 is wired to the circuit board 7, thereby forming stator 9.

Next, shaft 1 of rotor 10 goes through bearing 5 of stator 9, then ring-shaped thrust ring 16 made of magnetic material is fixed on shaft 1 by press-fitting at a given position from its tip having gone through bearing 5. Then cup-shaped thrust cup 17 made of magnetic material is inserted into bearing housing 4a along the opposite direction to the projecting direction of housing 4a, and fixed at a given position of the inner wall of housing 4a by press-fitting. Thrust receptor 18 excellent in abrasion resistance is placed in advance on the bottom face of thrust cup 17 such that receptor 18 contacts with the tip of shaft 1. Ring-shaped thrust attracting magnet 19 is placed in advance at a place confronting to thrust ring 16. Magnetic attracting force working between magnet 19 and ring 16 stabilizes variations in the thrust direction of rotor 10.

The construction discussed above allows a user to adjust a relative position between hall element 20 and stator core 8 both mounted on circuit board 7 such that a load current of the motor can be minimized while the assembled motor in accordance with the first embodiment rotates with a load.

The adjusting method is demonstrated more specifically with reference to FIGS. 2B and 2C. First, insert position adjusting jig 21 through bracket-through-hole 4d from the outside. Through-hole 4d is formed inside burred section 4c of mounting base 4b of bracket 4. Bring jig 21 into contact with a tip of salient pole 8a of stator core 8. Then as the arrow marks of a solid line or a broken line in FIG. 2B show, rotate stator core 8 a bit along the rotating direction or anti-rotating direction of the motor with respect to hall element 20 mounted on circuit board 7 fixed to bracket 4, so that the foregoing adjustment is done.

Since the adjustment is done while the motor rotates, burred section 4c and hole 7a of circuit board 7 are formed at places such that jig 21 will not touch rotor magnet 3 at its working tip. As already discussed, burred section 4c is inserted into hole 7a. The inner wall of cylindrical section 13a of metal holder 13 made of resin is press-fitted and fixed to the outer wall of bearing housing 4a, so that stator core 8 can be rotated with ease by the method discussed above even after the motor is assembled comparing with conventional motors. In the conventional motor, a stator core is directly press-fitted to an outer wall of a bearing housing of a bracket, i.e. both of the stator core and the bearing housing are made of metal, and the respective metal materials are press-fitted to each other. As a result, the adjustment for minimizing a load current of the motor can be done with ease.

This first embodiment proves that the motor of the present invention suppresses increment and dispersion of the motor current at a high rpm, so that the motor can work stably at a high rpm.

Exemplary Embodiment 2

Figure 4B:
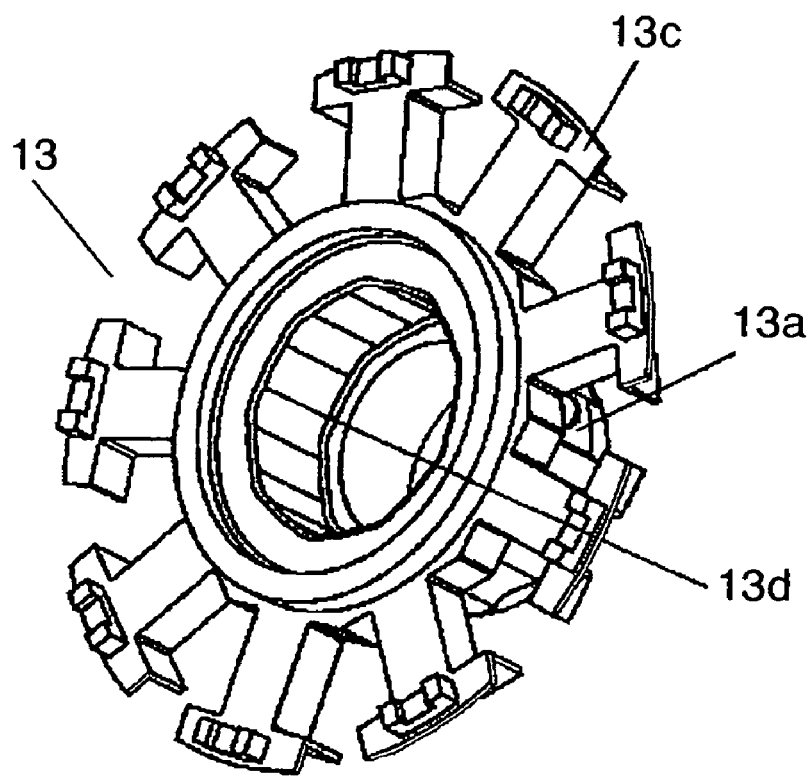
FIG. 4B shows a perspective view of a metal holder in accordance with a second embodiment of the present invention.
Figure 5:
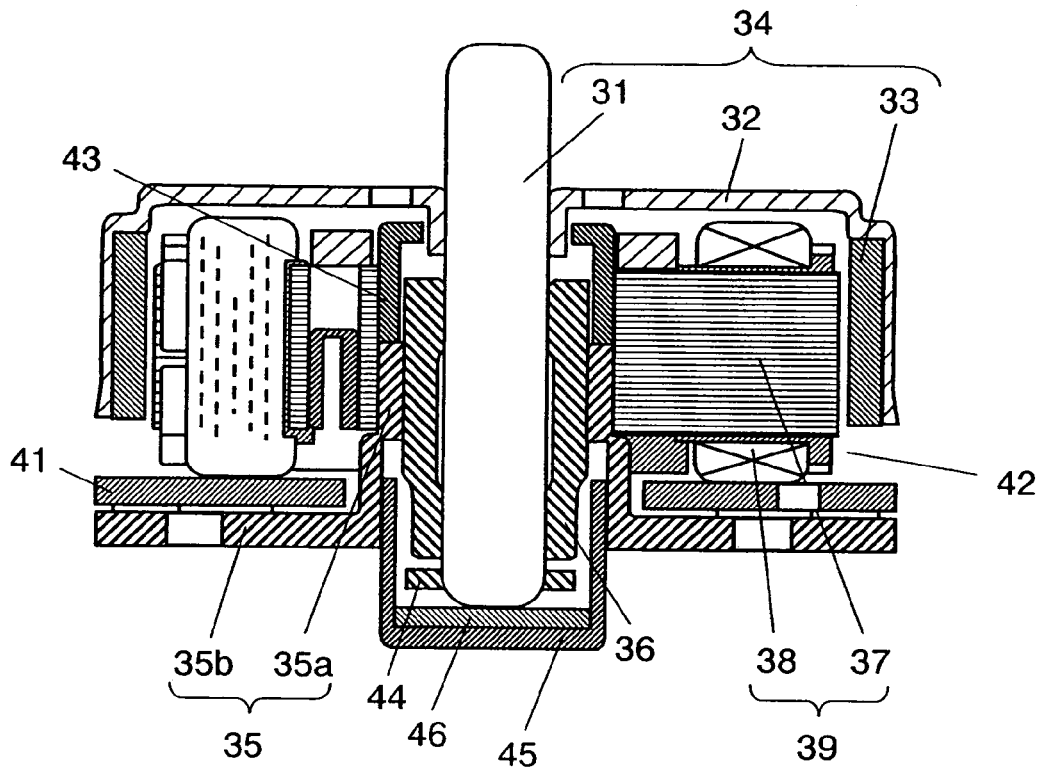
FIG. 5 shows a sectional view illustrating a structure of a first conventional motor.
Figure 6:
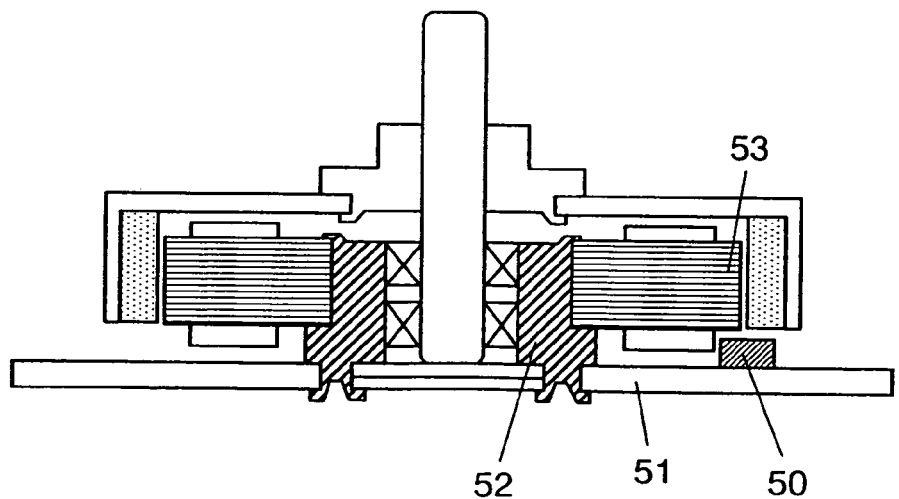
FIG. 6 shows a sectional view illustrating a structure of a second conventional motor.

FIG. 4B shows a perspective view of a metal holder in accordance with the second embodiment of the present invention. In FIG. 4B, on the inner wall of cylindrical section 13a of metal holder 13, a plurality of projecting sections (ribs) 13d are formed along the axial direction. Ribs 13d include an enveloping surface having the same inner diameter as or a little bit smaller than the outer diameter of the outer wall of bearing housing 4a shown in FIG. 1. The contact area between the outer wall of bearing housing 4a and the inner wall of cylindrical section 13a of metal holder 13 is limited only to projecting sections (ribs) 13d. This is the different point in the structure from the first embodiment.

The foregoing structure limits the contact area between the outer wall of bearing housing 4a and the inner wall of cylindrical section 13a of metal holder 13 only to ribs 13d, so that the press-fitting force applied to cylindrical section 13a with respect to bearing housing 4a can be appropriately adjusted. As a result, the press-fit can be done with ease. On top of that, the torque necessary for the adjusting jig can be further reduced, so that even if jig 21 touches stator coil 6, the adjustment can be completed without damaging stator coil 6 in the case that stator coil 6 is wound near to the tip of salient pole 8a. Further, because spaces are formed between the inner wall of cylindrical section 13a and the outer wall of bearing housing 4a, the spaces are filled with adhesive in advance, and the adhesive is hardened after the position adjustment, so that metal holder 13 and bearing housing 4a can be fixed to each other more strongly.

The mechanism discussed above makes it more easily to adjust a relative position between the hall element and the stator core such that a load current of the motor can be minimized, and a steady performance can be maintained advantageously after the adjustment.

In the embodiments previously discussed, the following structure is taken as an example: burred section 4c is formed on mounting base 4b of bracket 4, and circuit board 7 is rigidly mounted to bracket 4 while the through holes piercing bracket 4 and circuit board 7 respectively are formed. However, instead of forming the burred section, a simple hole can be formed and the circuit board is bonded and fixed to the bracket with adhesive. This structure also works as long as through holes piercing bracket 4 and circuit board 7 respectively are formed at places between adjacent two salient poles 8a among a plurality of salient poles and corresponding to the tips of the adjacent two salient poles 8a. In the previous embodiments, bracket 4 unitarily formed with bearing housing 4c is taken as an example; however, these two elements can be formed independently and then assembled together. This structure can also work.

What is claimed is:

1. A brushless motor comprising a rotor assembly and a stator assembly,
    wherein the rotor assembly includes:
        a shaft;
        a rotor frame having the shaft; and
        a rotor magnet disposed on inner wall of the rotor frame,
    wherein the stator assembly includes:
        a bearing for supporting the shaft;
        a bearing housing for holding the bearing;
        a bracket having the bearing housing and having a cylindrical protrusion with a first through hole formed in the cylindrical protrusion;
        a stator core having a plurality of salient poles confronting to the rotor magnet and disposed outside the bearing housing;
        a stator coil wound via an insulator on each one of the salient poles of the stator core; and
        a circuit board having:
            a hall element for detecting a magnet pole of the rotor magnet mounted on the circuit board,
            a second through hole formed in the circuit board, and
            an end of the stator coil is electrically coupled to the circuit board,
    wherein the circuit board is rigidly mounted to the bracket such that the cylindrical protrusion of the bracket is situated in the second through hole of the circuit board and the protrusion and the through hole are situated between adjacent two salient poles among the plurality of the salient poles and corresponding to tips of the two adjacent salient poles.

2. The brushless motor of claim 1, wherein the bracket includes a cylindrical burred section having the hole piercing the bracket, wherein the burred section goes through the hole piercing the circuit board and a part of the burred section is riveted outward for rigidly mounting the circuit board to the bracket.

3. The brushless motor of claim 1 further comprising a metal holder made of insulating resin, wherein the metal holder includes:
    a cylindrical section having an outer diameter identical to or smaller than an inner diameter of a hole formed on the stator core;
    an end face extending from an axial first end of the cylindrical section along the inner diameter direction; and
    a plurality of wings extending from an axial second end of the cylindrical section along a direction forming right angles with the axial direction such that the wings cover an axial first end face of the stator core,
    wherein a part of outer wall of the cylindrical section of the metal holder is rigidly mounted to hole wall of the stator core,
    wherein the stator coil is wound on the wings of the metal holder and an axial second end face of the stator core respectively via an insulator disposed independent of the wings, and
    wherein inner wall of the cylindrical section of the metal holder is rigidly mounted to outer wall of the bearing housing.

4. The brushless motor of claim 3, wherein a plurality of projecting sections having an enveloping surface, of which inner diameter is identical to or smaller than an outer diameter of the outer wall of the bearing housing, are formed axially on the inner wall of the cylindrical section of the metal holder, and a contacting area between the outer wall of the bearing housing and the inner wall of the cylindrical section is limited to the projecting sections.

* * * * *